US010571959B2

(12) United States Patent
Liao et al.

(10) Patent No.: US 10,571,959 B2
(45) Date of Patent: Feb. 25, 2020

(54) ROTATION RESETTING DEVICE AND ELECTRONIC APPARATUS

(71) Applicants: Chen-Yu Liao, Taipei (TW); Chun-Yi Ho, Taipei (TW); Huai-Te Tseng, Taipei (TW); Shih-Chin Chou, Taipei (TW); Ming-Chung Peng, Taipei (TW)

(72) Inventors: Chen-Yu Liao, Taipei (TW); Chun-Yi Ho, Taipei (TW); Huai-Te Tseng, Taipei (TW); Shih-Chin Chou, Taipei (TW); Ming-Chung Peng, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/282,252

(22) Filed: Feb. 21, 2019

(65) Prior Publication Data

US 2019/0361490 A1 Nov. 28, 2019

(30) Foreign Application Priority Data

May 22, 2018 (TW) .............................. 107117431 A (51) Int. Cl.
 *G06F 1/16* (2006.01)
 *H05K 5/02* (2006.01)
(52) U.S. Cl.
 CPC .......... *G06F 1/1609* (2013.01); *G06F 1/1658* (2013.01); *H05K 5/02* (2013.01)
(58) Field of Classification Search
 CPC combination set(s) only.
 See application file for complete search history.

(56) References Cited

U.S. PATENT DOCUMENTS

| 4,712,870 A | * | 12/1987 | Robinson | .............. G06F 1/1609 248/284.1 |
| 5,769,374 A | * | 6/1998 | Martin | .................. G06F 1/1605 248/221.11 |
| 5,786,806 A | * | 7/1998 | Fester | ...................... G05G 5/08 345/160 |

(Continued)

FOREIGN PATENT DOCUMENTS

| TW | M297590 | 9/2006 |
| TW | M424079 | 3/2012 |
| TW | M519920 | 4/2016 |

*Primary Examiner* — Lisa Lea-Edmonds
(74) *Attorney, Agent, or Firm* — JCIPRNET (57) ABSTRACT

A rotation resetting device and an electronic apparatus are provided. The rotation resetting device includes a functional unit, a limiting block and an elastic unit. The functional unit includes a functional element and a supporting element connected to the functional element, wherein the supporting element includes a limiting gasket. The limiting block has an accommodating space with an opening and a taper chute extending downward from the opening. The elastic unit is located in the accommodating space and connected between the limiting block and the functional unit. The functional unit is movably disposed in the accommodating space and is capable of moving between an use position and a storage position relative to the opening. When the functional unit moves from the use position to the storage position, the limiting gasket abuts the taper chute, and rotates and slides downward along the taper chute while compressing the elastic unit.

20 Claims, 12 Drawing Sheets

(56) References Cited

U.S. PATENT DOCUMENTS

| | | | |
|---|---|---|---|
| 5,801,919 A * | 9/1998 | Griencewic | G06F 1/1686 348/552 |
| 5,880,928 A * | 3/1999 | Ma | G06F 1/1616 361/679.23 |
| 5,978,213 A * | 11/1999 | Vossler | G06F 1/16 361/679.23 |
| 5,978,214 A * | 11/1999 | Vossler | G06F 1/16 361/679.23 |
| 6,163,326 A * | 12/2000 | Klein | G06F 1/1616 345/156 |
| 6,181,550 B1 * | 1/2001 | Kim | G06F 1/1616 361/679.06 |
| 6,243,260 B1 * | 6/2001 | Lundgren | G06F 1/1616 361/679.23 |
| 6,246,570 B1 * | 6/2001 | Kim | G06F 1/1616 361/679.23 |
| 6,501,644 B1 * | 12/2002 | Silverman | G06F 1/1613 248/560 |
| 6,869,240 B2 * | 3/2005 | Ito | G06F 3/0338 200/5 A |
| 7,057,888 B2 * | 6/2006 | Oakley | G06F 1/1601 361/679.23 |
| 8,224,179 B2 * | 7/2012 | Lin | G03B 17/02 348/376 |
| 8,861,189 B2 * | 10/2014 | Chen | G03B 29/00 348/207.1 |
| 9,736,383 B2 * | 8/2017 | Evans, V | H04N 5/2254 |
| 2005/0014527 A1 * | 1/2005 | Chambers | H04M 1/0264 455/556.1 |
| 2006/0061962 A1 * | 3/2006 | Oakley | G06F 1/1601 361/679.23 |
| 2006/0104015 A1 * | 5/2006 | Fu | G06F 1/1616 361/679.27 |

* cited by examiner

ROTATION RESETTING DEVICE AND ELECTRONIC APPARATUS

CROSS-REFERENCE TO RELATED APPLICATION

This application claims the priority benefit of Taiwan application serial no. 107117431, filed on May 22, 2018. The entirety of the above-mentioned patent application is hereby incorporated by reference herein and made a part of this specification.

BACKGROUND

Technical Field

The disclosure relates to a rotation reset device and an apparatus, and more particularly to a rotation resetting device, and an electronic apparatus using the rotation resetting device.

Description of Related Art

Current electronic apparatuses, such as laptop computers or all-in-one (AIO) computers, normally hide various functional units in their casing for appearance purposes. These functional units are pressed to protrude outside the casing when needed.

Take lens unit as an example, as consumer need changes, a lens unit installed on a laptop computer or an AIO computer can be rotated relative to the casing of the laptop computer or AIO computer. However, a foolproof design is needed to prevent users from misaligning the lens unit when storing the lens unit back into the casing.

SUMMARY

The disclosure provides a rotation resetting device capable of rotationally resetting a functional unit to a preset angle.

The rotation resetting device in the disclosure includes a functional unit, a limiting block and an elastic unit. The functional unit includes a functional element and a supporting element connected to the functional element, wherein the supporting element includes a limiting gasket. The limiting block has an accommodating space. The accommodating space includes an opening and a taper chute extending downward from the opening. The elastic unit is located in the accommodating space and connected between the limiting block and the functional unit. The functional unit is movably disposed in the accommodating space and is capable of moving between an use position and a storage position relative to the opening. When the functional unit moves from the use position to the storage position, the limiting gasket abuts the taper chute, and rotates and slides downward along the taper chute, while compressing the elastic unit. The functional unit can move from the storage position to the use position, by an elastic restoring force of the elastic unit.

An electronic apparatus in the disclosure includes a casing and the rotation resetting device installed inside the casing, wherein the rotation resetting device is capable of ascending relative to the casing to protrude outside the casing or descending to be stored inside the casing.

According to an embodiment of the disclosure, the electronic apparatus is a laptop computer, an all-in-one (AIO) computer, or a display screen.

According to an embodiment of the disclosure, when the functional unit moves from the storage position to the use position, the elastic unit provides the elastic restoring force to the functional unit.

According to an embodiment of the disclosure, the limiting gasket is a fan-shaped limiting gasket, and the taper chute is a fan-shaped taper chute. When the functional unit moves from the use position to the storage position, the fan-shaped limiting gasket abuts the fan-shaped taper chute, and rotates and slides downward along the fan-shaped taper chute.

According to an embodiment of the disclosure, the supporting element has a supporting element body, and a radial direction of the limiting gasket is perpendicular to an axial direction of the supporting element body.

According to an embodiment of the disclosure, the elastic unit includes a spring supporting element and a spring. The spring supporting element is located in the accommodating space. The spring is sleeved on the spring supporting element, and one end of the spring abuts against the functional element.

According to an embodiment of the disclosure, the rotation resetting device further includes a fixed block assembled with the limiting block. The fixed block has a groove, and the spring supporting element extends from the accommodating space into the groove.

According to an embodiment of the disclosure, the rotation resetting device further includes an engagement block installed in the groove of the fixed block. The engagement block has a tenon limiting structure, and a surface of the limiting gasket facing the engagement block has a tenon thereon. The tenon limiting structure is capable of limiting a position of the tenon or releasing the tenon. When the tenon limiting structure limits the position of the tenon, the functional unit is pressed to allow the tenon to be released from the tenon limiting structure, and an elastic restoring force provided by the spring allows the functional element to be ejected facing forward at a preset angle.

According to an embodiment of the disclosure, the rotation resetting device further includes an electromagnet and a magnet. The electromagnet is installed on the engagement block, while the magnet is installed on a surface of the limiting gasket facing the engagement block. By applying current to the electromagnet, the limiting gasket and the engagement block can be fixed together.

According to an embodiment of the disclosure, the functional element is a filming lens, a projection lens, an infrared transmitter, an infrared receiver, a fingerprint recognition device, a loudspeaker, a microphone, a connection port, or a power switch.

Based on the above, in the rotation resetting device in the disclosure, cooperation between the limiting gasket and the taper chute allows the functional element of the functional unit to rotate to the preset angle.

To make the aforementioned and other features of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

First Embodiment

Figure 1:
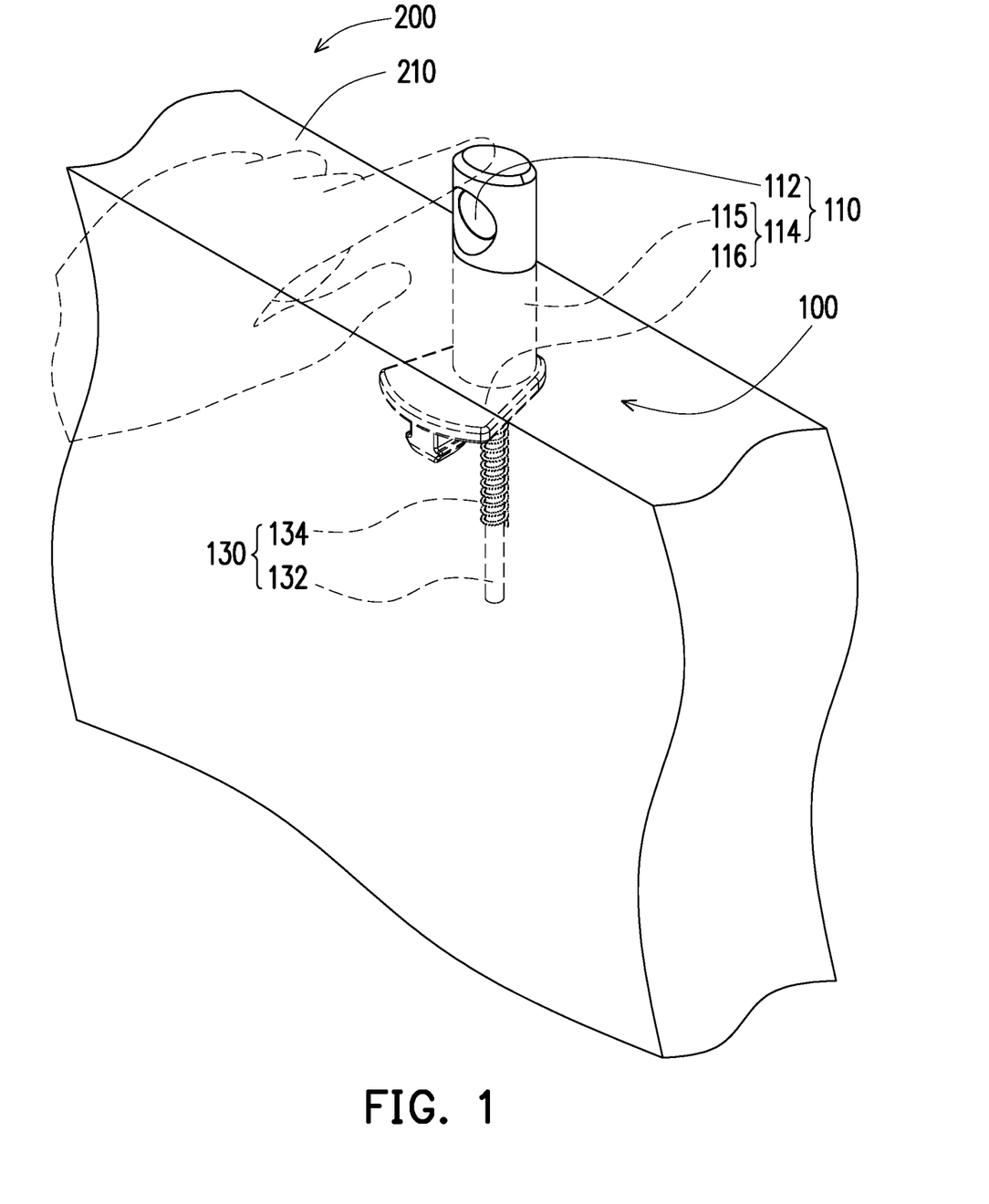
FIG. 1 is a schematic diagram of applying a rotation resetting device in an electronic apparatus according to a first embodiment of the disclosure.
Figure 2A:
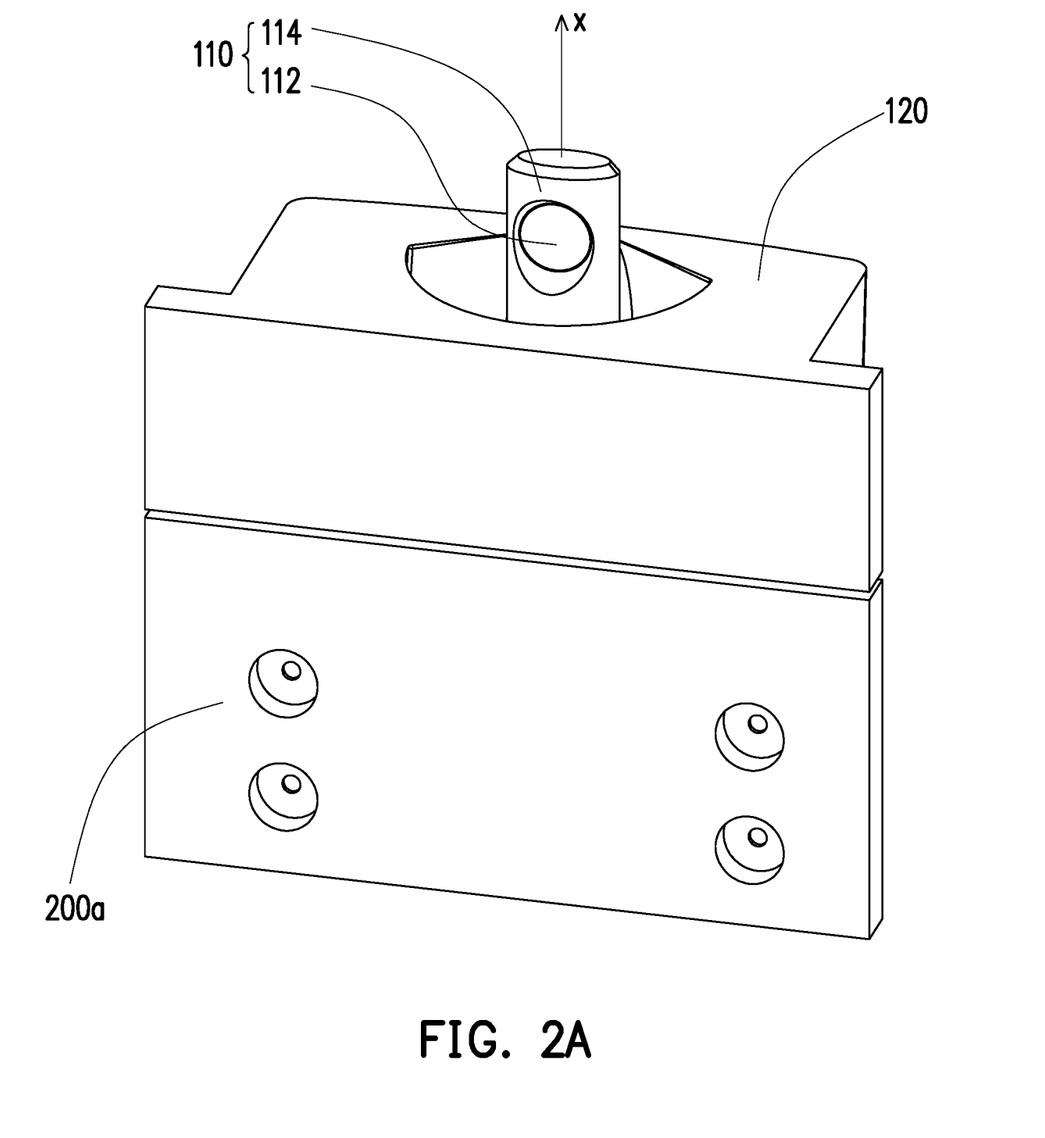
FIG. 2A is a schematic diagram in which the rotation resetting device in FIG. 1 and an internal structure block of the electronic apparatus are fixed together.
Figure 2B:
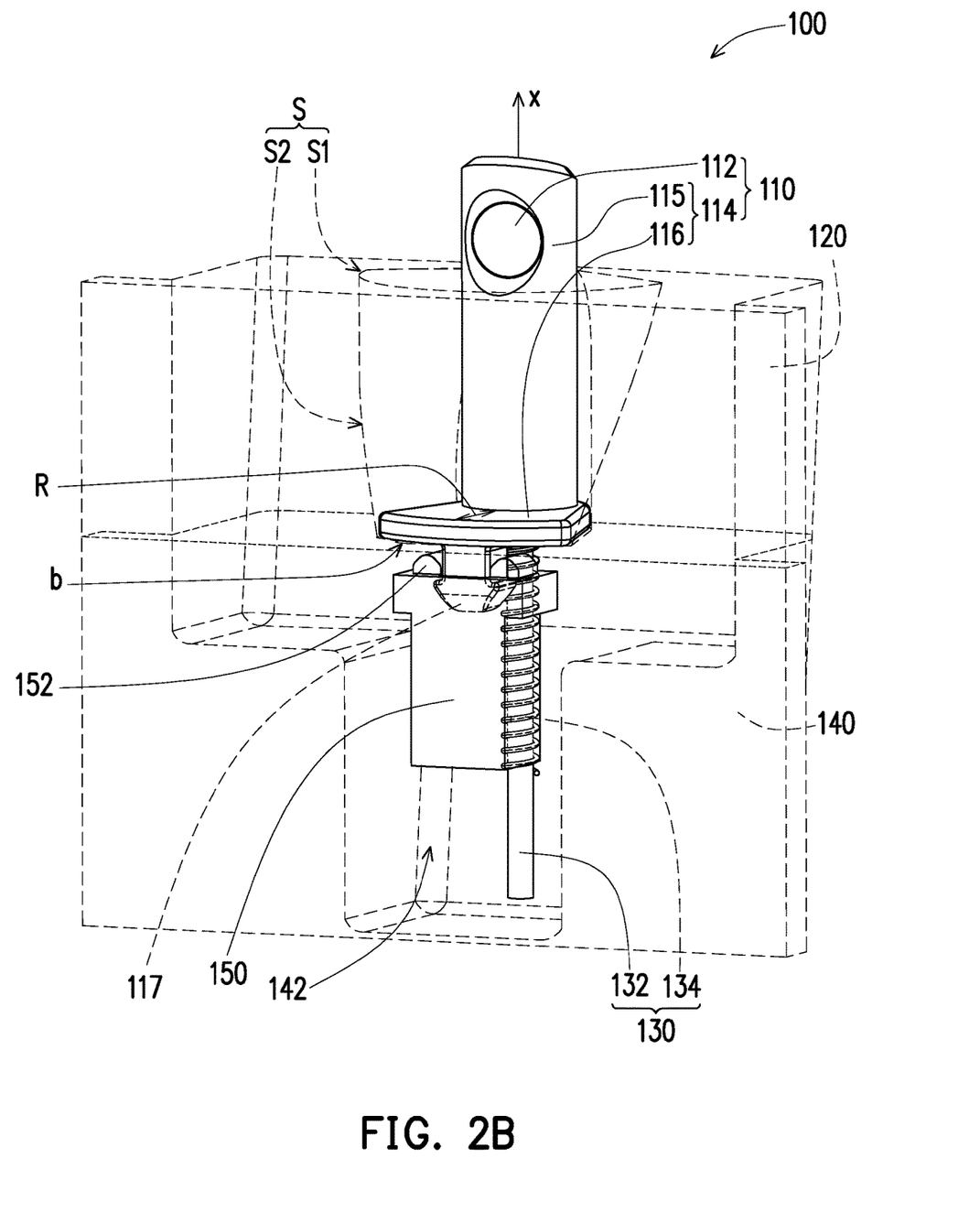
FIG. 2B is a perspective diagram of FIG. 2A.

FIG. 1 is a schematic diagram of applying a rotation resetting device in an electronic apparatus according to a first embodiment of the disclosure. FIG. 2A is a schematic diagram in which the rotation resetting device in FIG. 1 and an internal structure block of the electronic apparatus are fixed together. FIG. 2B is a perspective diagram of FIG. 2A. Please refer to FIG. 1, FIG. 2A and FIG. 2B together. For simple illustration, some parts are omitted in FIG. 1. A rotation resetting device 100 can be assembled onto an electronic apparatus 200 such as a laptop computer, an all-in-one (AIO) computer, or a general display screen through an internal structure 200a of the electronic apparatus 200, and is used to restore a functional element 112, which protrudes outside a casing 210 of the electronic apparatus 200, at a preset angle. The rotation resetting device 100 includes a functional unit 110, a limiting block 120, and an elastic unit 130. The functional unit 110 includes the functional element 112 and a supporting element 114 connected to the functional element 112, wherein the supporting element 114 includes a limiting gasket. The limiting block 120 has an accommodating space S. The accommodating space S includes an opening S1 and a taper chute extending downward from the opening S1. The elastic unit 130 is located in the accommodating space S, and is connected between the limiting block 120 and the functional unit 110. The functional unit 110 is movably disposed in the accommodating space S and is capable of moving between an use position and a storage position relative to the opening S1. Following the above, the limiting gasket in the present embodiment is a fan-shaped limiting gasket 116, and the taper chute is a fan-shaped taper chute S2. When the functional unit 112 moves from the use position to the storage position, the fan-shaped limiting gasket 116 abuts the fan-shaped taper chute S2, and rotates and slides downward along the fan-shaped taper chute S2. Cooperation between the fan-shaped limiting gasket 116 and the fan-shaped taper chute S2 allows the functional unit 110 to be restored to a preset angle and be stored into the accommodating space S.

Following the above, the functional element 112 in the present embodiment can be a filming lens, a projection lens, an infrared transmitter, an infrared receiver, a fingerprint recognition device, a loudspeaker, a microphone, a connection port, or a power switch. The following explains an example where the functional element 112 is illustrated as a lens.

Figure 3:
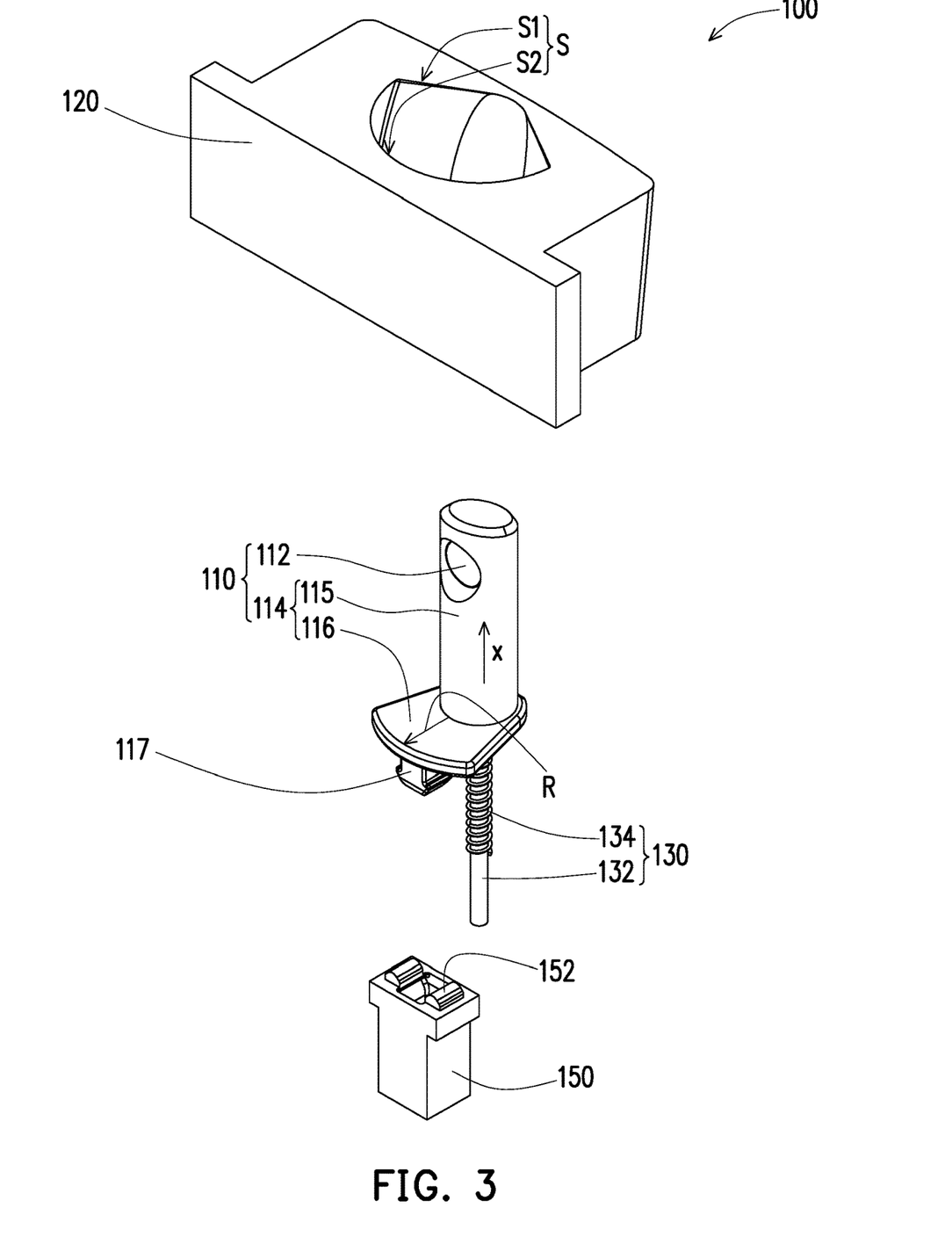
FIG. 3 is a schematic breakdown of local elements in FIG. 2B.

FIG. 3 is a schematic breakdown of local elements in FIG. 2B. Referring to FIG. 2B and FIG. 3 together, the supporting element 114 has a supporting element body 115, and a radial direction R of the fan-shaped limiting gasket 116 is perpendicular to an axial direction X of the supporting element body 115. The elastic unit 130 includes a spring supporting element 132 and a spring 134. The spring supporting element 132 is located in the accommodating space S. The spring 134 is sleeved on the spring supporting element 132, and one end of the spring 134 abuts against the functional element 112.

In addition, the rotation resetting device 100 further includes a fixed block 140 assembled with the limiting block 120. The fixed block 140 has a groove 142, and the spring supporting element 132 extends from the accommodating space S into the groove 142. Besides, the rotation resetting device 100 further includes an engagement block 150 installed in the groove 142 of the fixed block 140. The engagement block 150 has a tenon limiting structure 152, and a surface of the fan-shaped limiting gasket 116 facing the engagement block 150 has a tenon 117 thereon. The tenon limiting structure 152 is capable of limiting a position of the tenon 117 or releasing the tenon 117.

Figure 4A:
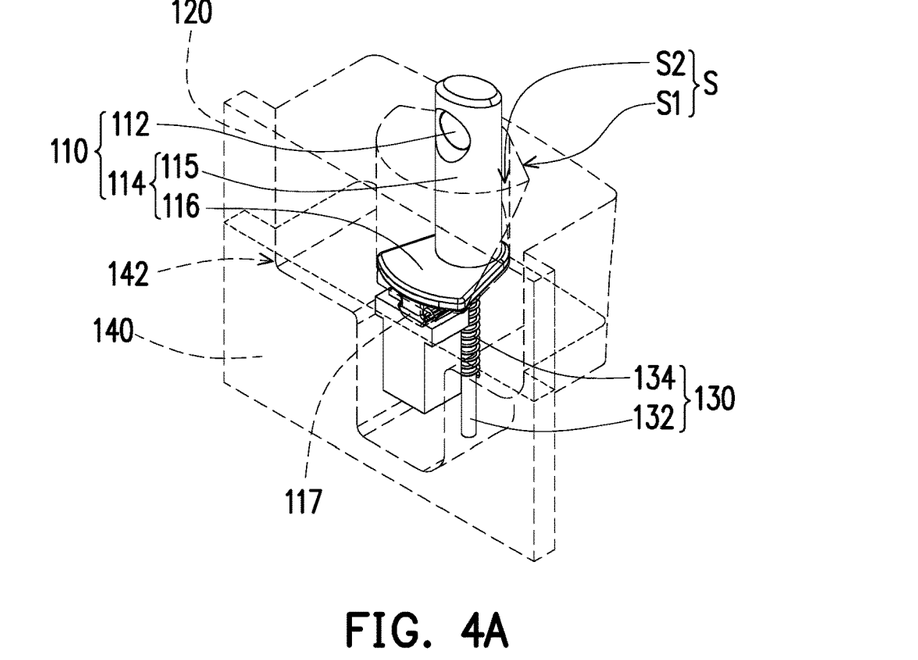
FIG. 4A, FIG. 4B, and FIG. 4C are schematic diagrams of using the functional unit.

FIG. 4A, FIG. 4B, and FIG. 4C are schematic diagrams of using the functional unit. Referring to FIG. 2B and FIG. 4A together, when the functional unit 110 is stored in the accommodating space S, the tenon 117 located on a surface b of the fan-shaped limiting gasket 116 facing the engagement block 150 and the tenon limiting structure 152 of the engagement block 150 are engaged with each other. The combination of the tenon 117, the tenon limiting structure 152, and the elastic unit 130 can be an elastic restoring force fixed slot mechanism (push-in/push-put mechanism). The position of the functional unit 110 relative to the engagement block 150 can be limited by engaging the tenon 117 with the tenon limiting structure 152. At this moment, the functional unit 110 is located in the storage position. Meanwhile, the supporting element body 115 of the functional unit 110 pushes against the spring 134, causing the spring 134 to store an elastic restoring force.

Figure 4B:
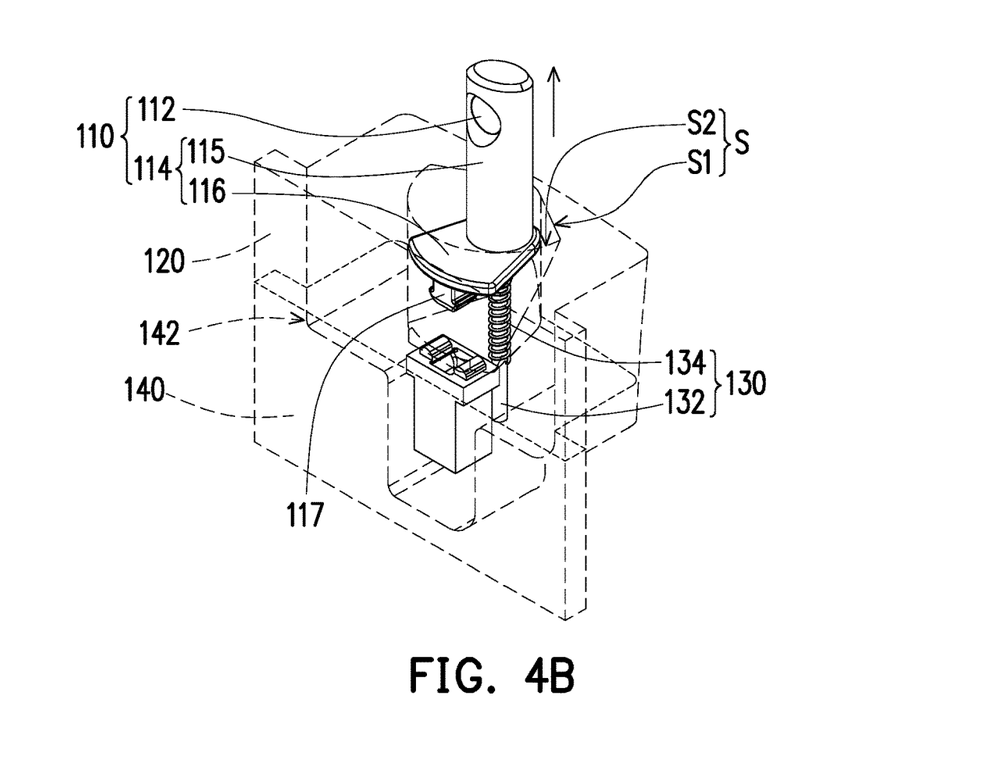

Referring to FIG. 4A and FIG. 4B together, when the user presses the functional unit 110 to cause the tenon 117 to separate from the tenon limiting structure 152, the tenon limiting structure 152 releases the functional unit 110, and the spring 134 releases the elastic restoring force to push the supporting element body 115, allowing the functional unit 110 to move from the storage position to the use position.

Figure 4C:
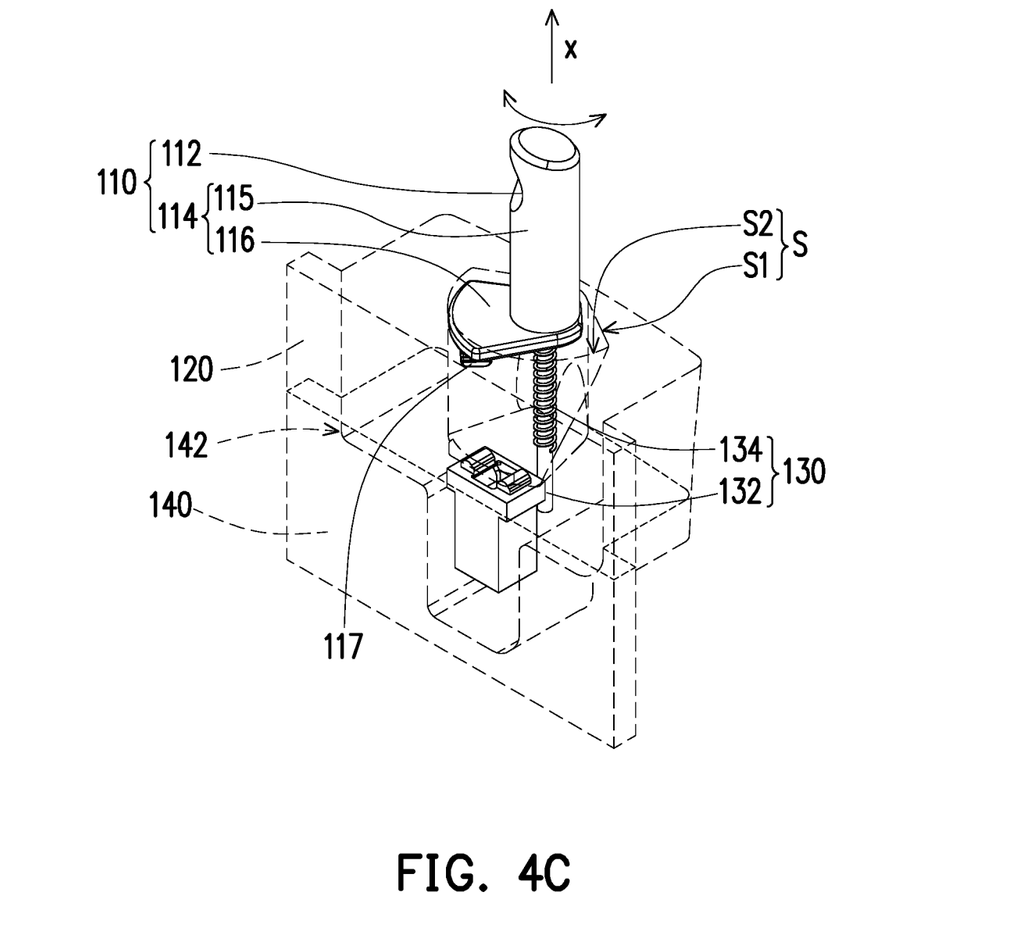

Next, as shown in FIG. 4C, the user may cause the functional unit 110 to rotate along the axial direction of the supporting element 114 as needed, allowing the functional unit 112 acting as the lens to face a certain direction as needed.

Figure 5A:
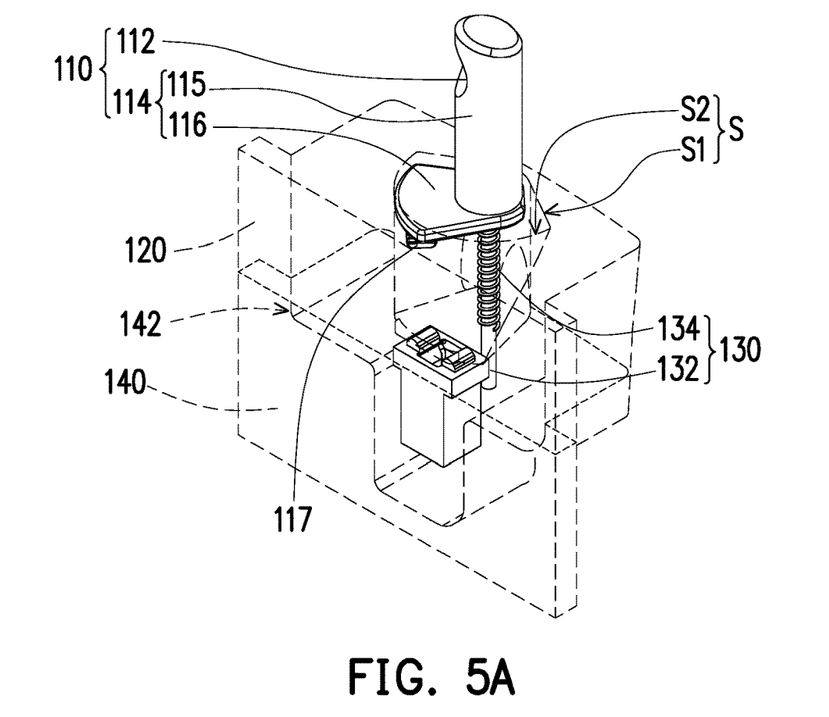
FIG. 5A to FIG. 5C are schematic perspective diagrams of restoring the function unit from an use position back to a storage position.
Figure 5B:
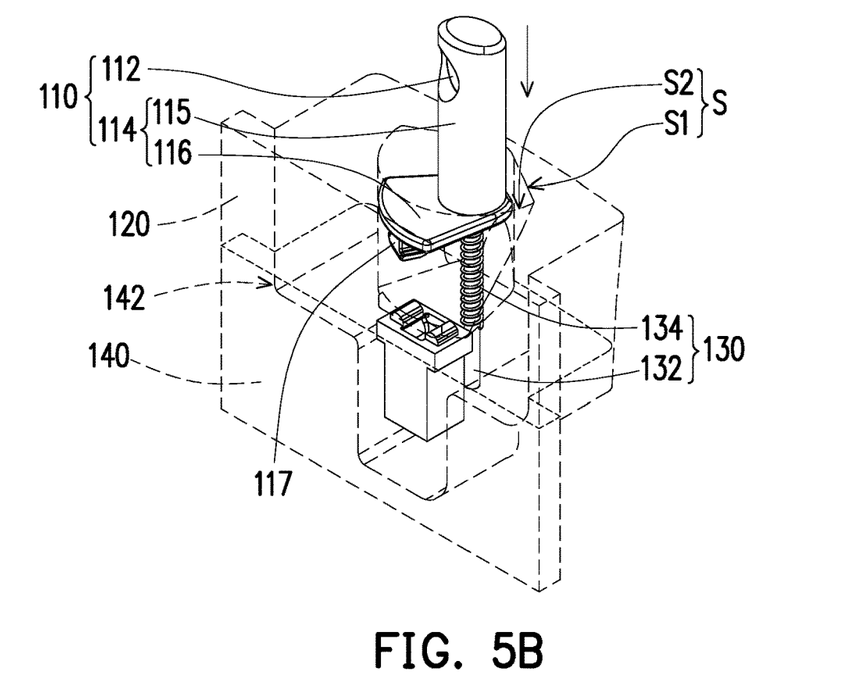
Figure 5C:
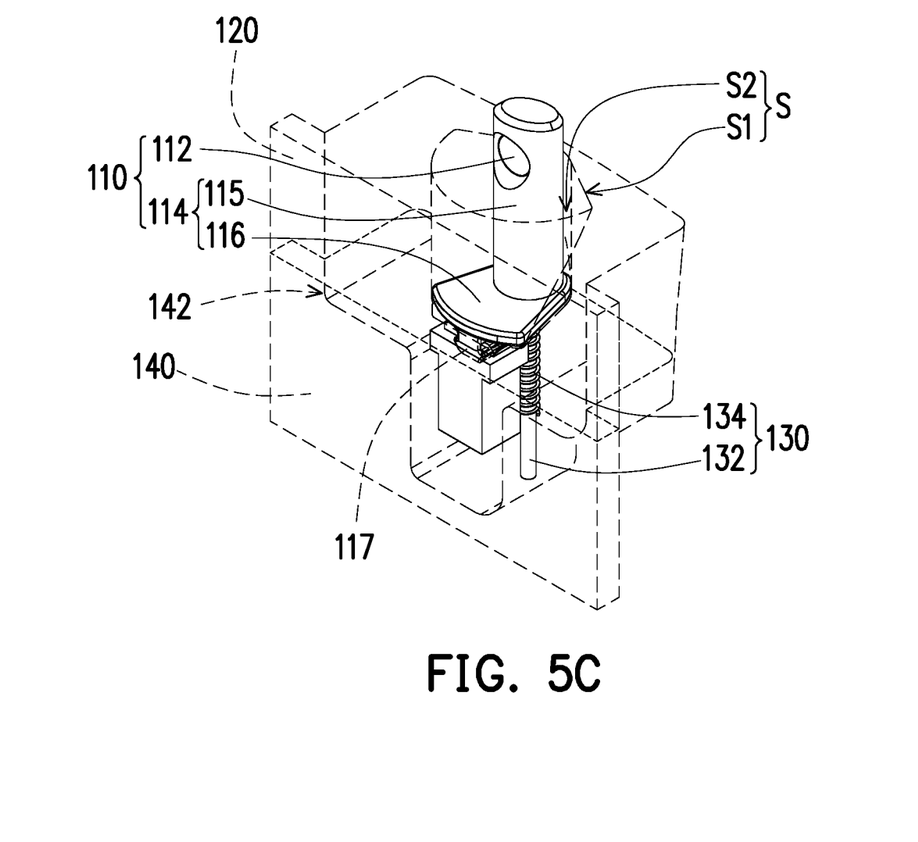

FIG. 5A to FIG. 5C are schematic perspective diagrams of restoring the function unit from the use position back to the storage position. Referring to FIG. 5A to FIG. 5C, when the functional unit 110 is located in the use position, the functional unit 112 acting as the lens protrudes outside the limiting block 120. The functional unit 110 is capable of rotating to a desired angle as needed in the accommodating space S with the axial direction X of the supporting element body 115 as a rotation axis by a match between the fan-shaped limiting gasket 116 and the shape of the opening S1. Then, when the user desires to move the functional unit 110 from the use position to the storage position, the user applies pressure to cause the functional unit 110 to move downward. Meanwhile, the fan-shaped limiting gasket 116 moves downward along the fan-shaped taper chute S2 from the opening S1 while compressing the spring 134 of the elastic unit 130. The fan-shaped limiting gasket 116 further rotates along an outline of the fan-shaped taper chute S2 with the axial direction X of the supporting element body 115 as the rotation axis, allowing the functional unit 110 to gradually restore to the preset angle, for example, an angle at which the functional unit 112 acting as the lens is caused to face forward.

When the functional unit 110 moves to the storage position, the tenon 117 disposed on the surface b of the fan-shaped limiting gasket 116 facing the engagement block 150 and the tenon limiting structure 152 disposed on the engagement block 150 are engaged with each other again to fix the functional unit 110.

Afterwards, the user can directly apply pressure to the functional unit 110 to release the tenon 117 from the tenon limiting structure 152 when the user desires to use the functional unit 110 again. The functional unit 110 moves from the storage position to the use position by the elastic restoring force of the spring 134, and the functional unit 112 acting as the lens is ejected facing forward at a preset angle.

Second Embodiment

Figure 6:
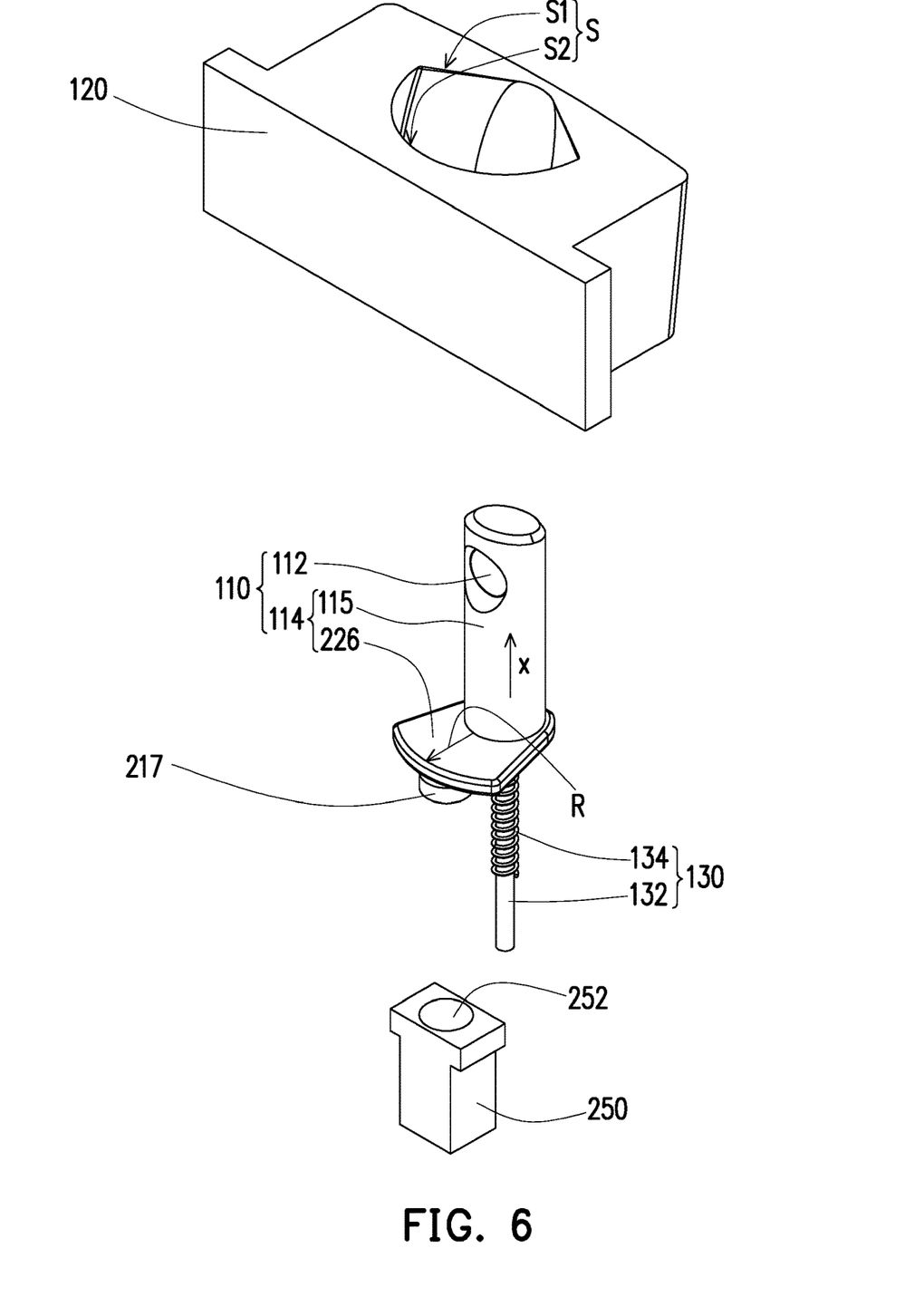
FIG. 6 is a schematic diagram in which a tenon and a tenon limiting structure are replaced with an electromagnet and a magnet.

The present embodiment is generally similar to the first embodiment. The difference therebetween is that the tenon 117 and the tenon limiting structure 152 in the first embodiment are achieved by cooperation between a magnet 217 and an electromagnet 252.

FIG. 6 is a schematic diagram in which the tenon and the tenon limiting structure are replaced with an electromagnet and a magnet. Referring to FIG. 6, in the present embodiment, the electromagnet 252 is disposed on the engagement block 250 to replace the tenon limiting structure 152 (as shown in FIG. 2B). Besides, the magnet 217 is disposed on the surface b of the fan-shaped limiting gasket 216 facing the engagement block 250 to replace the tenon 117 (as shown in FIG. 2B). By applying current to the electromagnet 252, the electromagnet 252 and the magnet 217 are attracted to each other, and thus allowing the fan-shaped limiting gasket 216 and the engagement block 250 to be fixed together.

Figure 7:
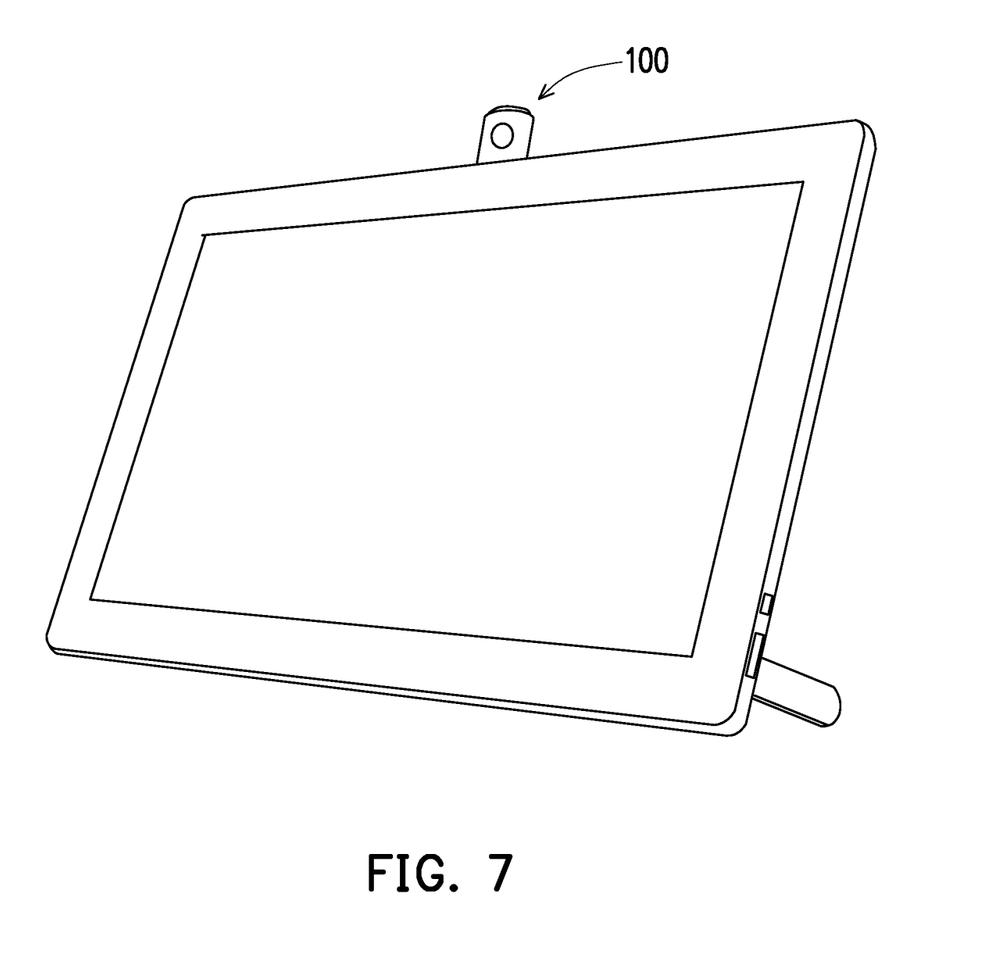
FIG. 7 is a schematic diagram of applying the rotation resetting device in an AIO computer.
Figure 8:
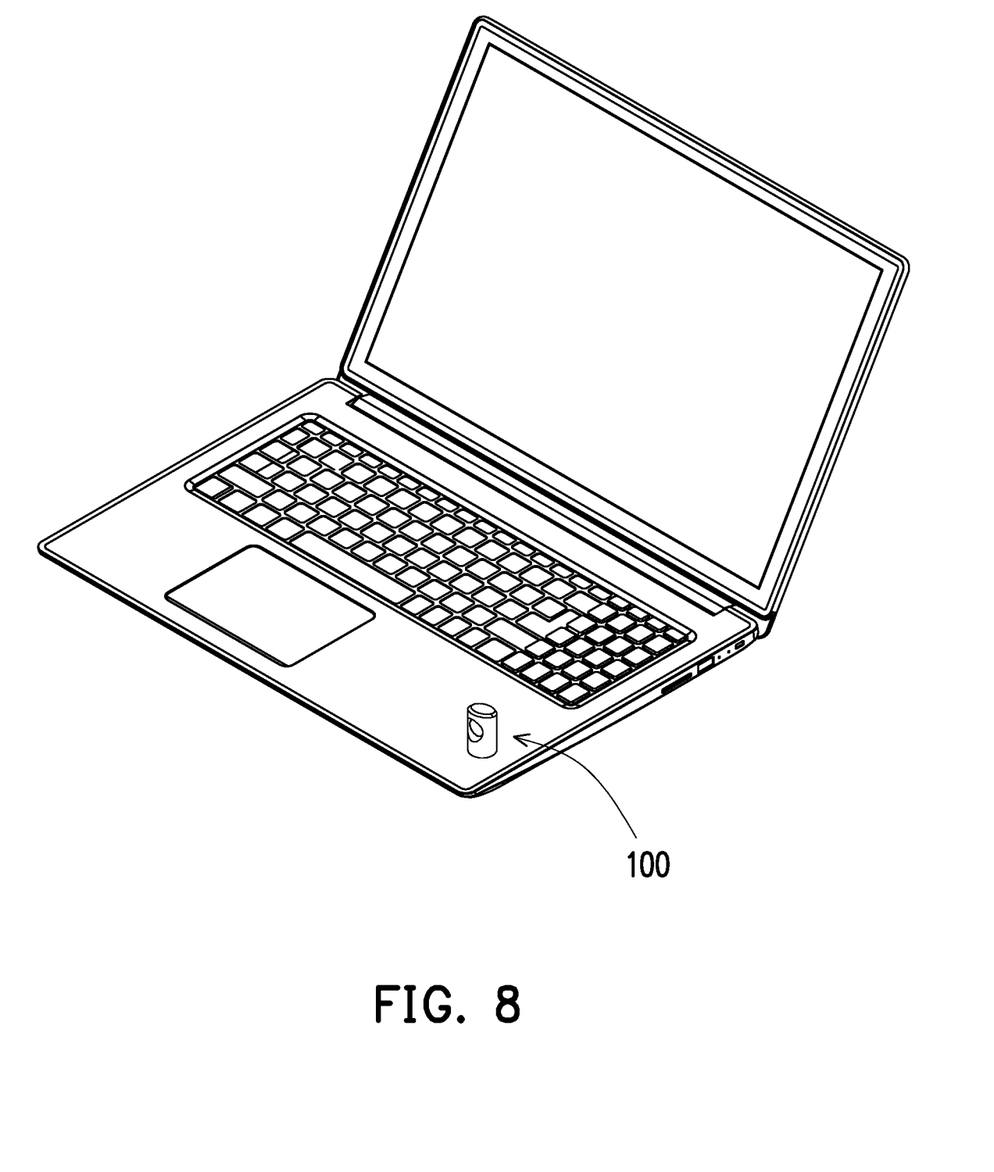
FIG. 8 is a schematic diagram of applying the rotation resetting device in a laptop computer.
Figure 9:
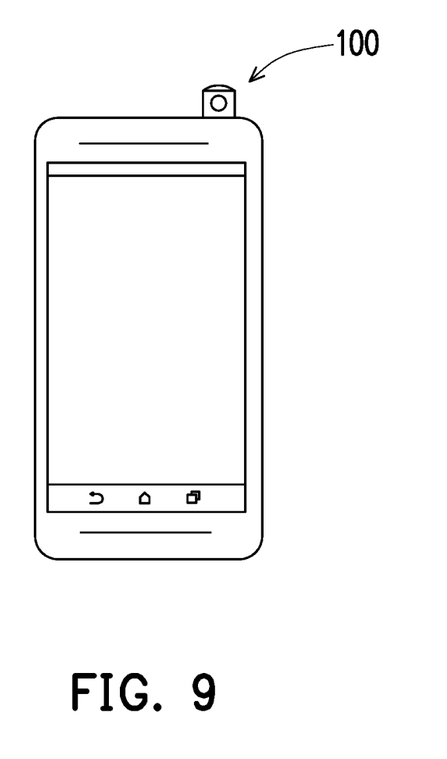
FIG. 9 is a schematic diagram of applying the rotation resetting device in a smartphone.

The rotation resetting device described in the first and second embodiments can be applied to electronic apparatuses of various forms and sizes, such as AIO computers, laptop computers, smartphones, and so on. FIG. 7 is a schematic diagram of applying the rotation resetting device in an AIO computer, FIG. 8 is a schematic diagram of applying the rotation resetting device in a laptop computer, and FIG. 9 is a schematic diagram of applying the rotation resetting device in a smartphone. Referring to FIG. 7 to FIG. 9 together, the rotation resetting device in the above two embodiments can be applied to an electronic apparatus, such as an AIO computer, a laptop computer, a smartphone, that requires a functional element capable of extending and retracting relative to the casing, and the application is not limited to what described in the present embodiment.

In summary, in the rotation resetting device of the disclosure, when the functional unit protrudes outside the casing of the electronic apparatus, no matter what angle the functional unit is at according to user needs, the functional unit can be gradually restored to a preset angle during a restoring process back to the storage position and can be stored at the preset angle by applying pressure to the functional unit and by cooperation between the fan-shaped limiting gasket and the fan-shaped taper chute. The user only needs to press the functional unit when the user desires to use the functional unit again, and the functional element can be ejected outside the casing of the electronic apparatus at the preset angle (such as facing forward) through cooperation of the elastic unit.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A rotation resetting device, comprising:
   a functional unit, comprising a functional element and a supporting element connected to the functional element, wherein the supporting element comprises a limiting gasket;
   a limiting block, having an accommodating space, wherein the accommodating space comprises an opening and a taper chute extending downward from the opening; and
   an elastic unit, located in the accommodating space and connected between the limiting block and the functional unit, wherein
   the functional unit is movably disposed in the accommodating space and is capable of moving between an use position and a storage position relative to the opening,
   when the functional unit moves from the use position to the storage position, the limiting gasket abuts the taper chute, the limiting gasket rotates and slides downward along the taper chute while compressing the elastic unit, and
   the functional unit can move from the storage position to the use position by an elastic restoring force of the elastic unit.

2. The rotation resetting device according to claim 1, wherein the limiting gasket is a fan-shaped limiting gasket, the taper chute is a fan-shaped taper chute, and when the functional unit moves from the use position to the storage position, the fan-shaped limiting gasket abuts the fan-shaped taper chute, and rotates and slides downward along the fan-shaped taper chute.

3. The rotation resetting device according to claim 1, wherein the supporting element has a supporting element body, and a radial direction of the limiting gasket is perpendicular to an axial direction of the supporting element body.

4. The rotation resetting device according to claim 1, wherein the elastic unit comprises:
   a spring supporting element located in the accommodating space; and
   a spring sleeved on the spring supporting element, wherein one end of the spring abuts against the functional element.

5. The rotation resetting device according to claim 4, further comprising a fixed block assembled with the limiting block, wherein the fixed block has a groove, and the spring supporting element extends from the accommodating space into the groove.

6. The rotation resetting device according to claim 5, further comprising an engagement block installed in the groove of the fixed block, wherein the engagement block has a tenon limiting structure, and a surface of the fan-shaped limiting gasket facing the engagement block has a tenon thereon, and the tenon limiting structure is capable of limiting a position of the tenon or releasing the tenon.

7. The rotation resetting device according to claim 6, wherein when the tenon limiting structure limits the position of the tenon, the functional unit is pressed to allow the tenon to be released from the tenon limiting structure, and the elastic restoring force provided by the spring allows the functional element to be ejected facing forward at a preset angle.

8. The rotation resetting device according to claim 5, further comprising an electromagnet and a magnet, wherein the electromagnet is installed on the engagement block, while the magnet is installed on a surface of the limiting gasket facing the engagement block, and by applying current to the electromagnet, the limiting gasket and the engagement block can be fixed together.

9. The rotation resetting device according to claim 1, wherein the functional element is a filming lens, a projection lens, an infrared transmitter, an infrared receiver, a fingerprint recognition device, a loudspeaker, a microphone, a connection port, or a power switch.

10. An electronic apparatus, comprising:
a casing;
a rotation resetting device, disposed inside the casing, and capable of ascending relative to the casing to protrude outside the casing or descending to be stored inside the casing, the rotation resetting device comprising:
  a functional unit, comprising a functional element and a supporting element connected to the functional element, wherein the supporting element comprises a limiting gasket;
  a limiting block, having an accommodating space, wherein the accommodating space comprises an opening and a taper chute extending downward from the opening; and
  an elastic unit, located in the accommodating space and connected between the limiting block and the functional unit, wherein
  the functional unit is movably disposed in the accommodating space and is capable of moving between an use position and a storage position relative to the opening,
  when the functional unit moves from the use position to the storage position, the limiting gasket abuts the taper chute, rotates and slides downward along the taper chute while compressing the elastic unit, and the functional unit can move from the storage position to the use position by an elastic restoring force of the elastic unit.

11. The electronic apparatus according to claim 10, wherein the electronic apparatus is a laptop computer, an all-in-one computer, or a display screen.

12. The electronic apparatus according to claim 10, wherein when the functional unit moves from the storage position to the use position, the elastic unit provides the elastic restoring force to the functional unit.

13. The electronic apparatus according to claim 10, wherein the supporting element has a supporting element body, and a radial direction of the limiting gasket is perpendicular to an axial direction of the supporting element body.

14. The electronic apparatus according to claim 10, wherein the elastic unit comprises:
  a spring supporting element located in the accommodating space; and
  a spring sleeved on the spring supporting element, wherein one end of the spring abuts against the functional element.

15. The electronic apparatus according to claim 14, wherein the rotation resetting device further comprises a fixed block assembled with the limiting block, wherein the fixed block has a groove, and the spring supporting element extends from the accommodating space into the groove.

16. The electronic apparatus according to claim 15, wherein the rotation resetting device further comprises an engagement block installed in the groove of the fixed block, wherein the engagement block has a tenon limiting structure, a surface of the limiting gasket facing the engagement block has a tenon thereon, and the tenon limiting structure is capable of limiting a position of the tenon or releasing the tenon.

17. The electronic apparatus according to claim 16, wherein when the tenon limiting structure limits the position of the tenon, the functional unit is pressed to allow the tenon to be released from the tenon limiting structure, and the elastic restoring force provided by the spring allows the functional element to be ejected facing forward at a preset angle.

18. The electronic apparatus according to claim 15, wherein the rotation resetting device further comprises an electromagnet and a magnet, wherein the electromagnet is installed on the engagement block, while the magnet is installed on a surface of the limiting gasket facing the engagement block, and by applying current to the electromagnet, the limiting gasket and the engagement block can be fixed together.

19. The electronic apparatus according to claim 10, wherein the functional element is a filming lens, a projection lens, an infrared transmitter, an infrared receiver, a fingerprint recognition device, a loudspeaker, a microphone, a connection port, or a power switch.

20. The electronic apparatus according to claim 10, wherein the limiting gasket is a fan-shaped limiting gasket, the taper chute is a fan-shaped taper chute, and when the functional unit moves from the use position to the storage position, the fan-shaped limiting gasket abuts the fan-shaped taper chute, rotates and slides downward along the fan-shaped taper chute.

* * * * *